Inventor
Louis de Linieres,

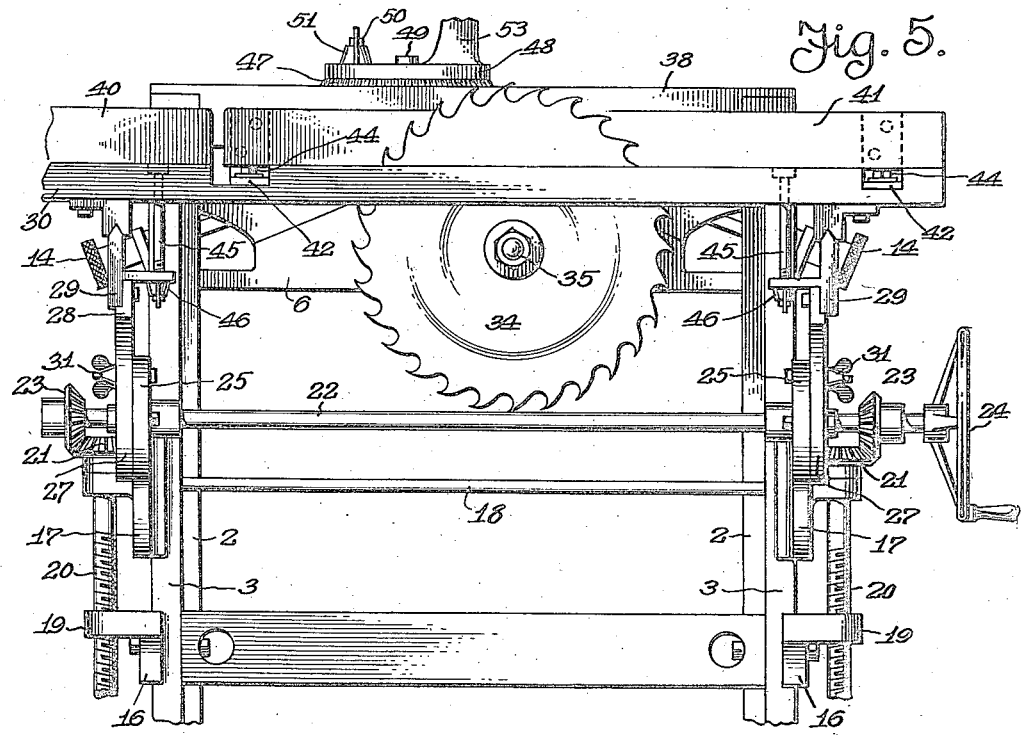
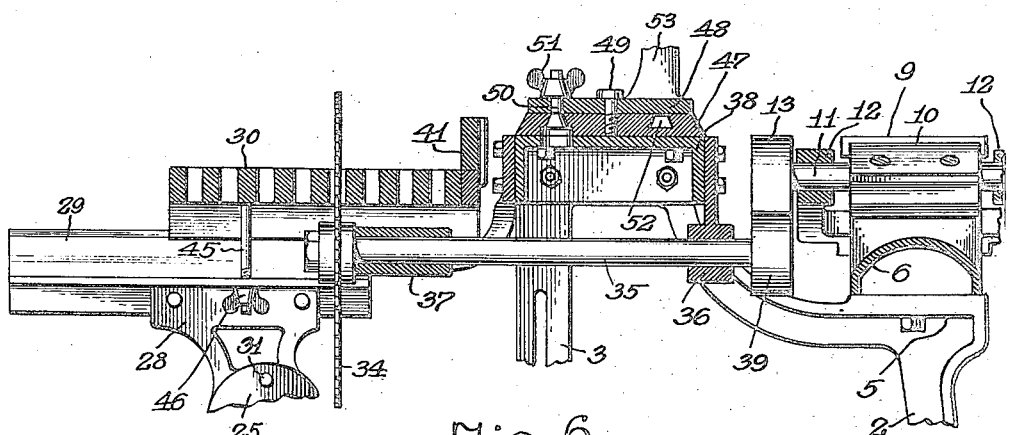

Patented Feb. 5, 1924.

1,482,631

UNITED STATES PATENT OFFICE.

LOUIS DE LINIERES, OF DETROIT, MICHIGAN, ASSIGNOR, BY MESNE ASSIGNMENTS, TO THE WOODWORKER MANUFACTURING CO. INC., OF DETROIT, MICHIGAN, A CORPORATION OF MICHIGAN.

WOODWORKING MACHINE.

Application filed November 8, 1920. Serial No. 422,631.

*To all whom it may concern:*

Be it known that I, LOUIS DE LINIERES, a citizen of the United States of America, residing at Detroit, in the county of Wayne and State of Michigan, have invented certain new and useful Improvements in Woodworking Machines, of which the following is a specification, reference being had therein to the accompanying drawings.

This invention relates to a universal wood sawing, planing and boring machine, and has special reference to an electrically operated machine that may be advantageously used by wood workers for performing various operations heretofore performed by separate and independent machines. It is therefore obvious that a machine in accordance with my invention will occupy a comparatively small space in a factory, save time, and increase production.

The primary object of my invention is to provide a machine of the above type which may be equipped with various kinds of saws, planing tools and drills so that all kinds of work may be performed by the machine. The saws, cutters and other tools are interchangeable and provision is made so that different operations may be simultaneously carried on by one or more artisans.

Another object of my invention is to provide a machine having all the adjustable features for a cross cut saw, a ripping saw, a planer, a gainer, and drilling and boring machines. In order that a circular saw may be used for miter and gain operations, especially in connection with stairway work, the circular saw is supported for reciprocation and adjustment at any desired angle, and associated with the saw is the source of power so that the reciprocable saw and the boring or drilling tool may be operated after being adjusted.

A further object of my invention is to provide a saw and planer with the operating shafts thereof located so that a single power transmission member may be employed for operating the saw and planer.

The above and other objects are attained by a machine that will be hereinafter described and then claimed, and reference will now be had to the drawings, wherein Figure 1 is an elevation of the planer side of the machine, partly broken away and partly in section;

Fig. 5 is an elevation of a portion of the machine; showing the saw side thereof, and Fig. 6 is a cross sectional view of a portion of the machine on the line VI—VI of Fig. 4.

Figure 1:
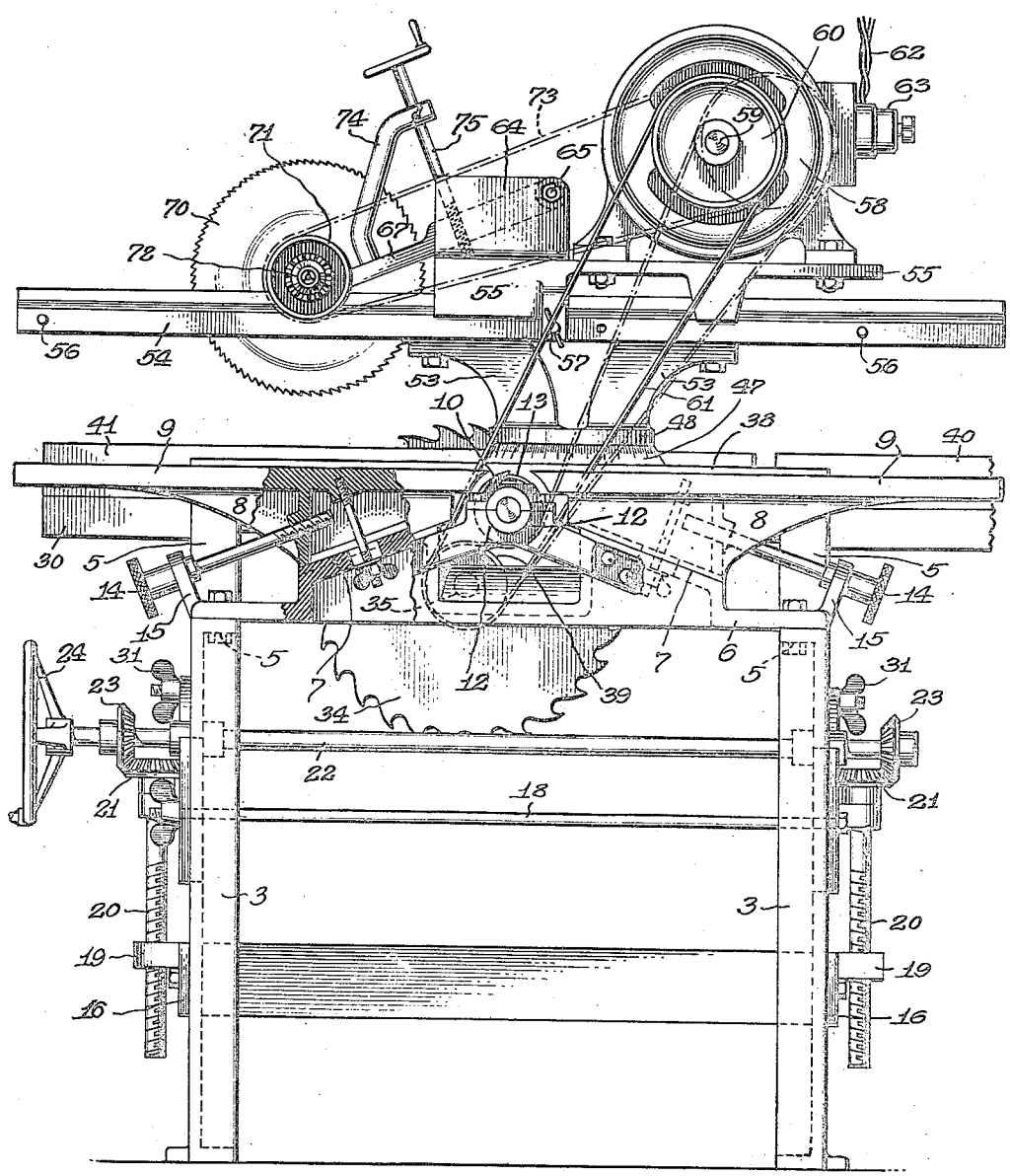

The machine comprises end frames 1 having legs 2 and 3 with the upper ends of the legs of each end frame connected to provide supports 4 and 5 and the supports 4 of said end frame are in a horizontal plane above the plane of the supports 5.

The supports 5 are at what may be considered the planer side of the machine and said supports are connected by a planer bed 6 having opposed inclined ways 7 for slides 8 of a planer table 9, said planer table being made in two parts maintained in a horizontal plane with the confronting ends thereof providing clearance for a rotary cutter 10 or other planing tool adapted to operate upon wood or other material shifted on the planer table 9. The rotary cutter 10 is mounted on a shaft 11 journaled in side bearings 12 secured to the sides of the ways 7 of the planer bed 6, and the inner end of the shaft 11 has a pulley or power transmitting wheel 13.

The two part planer table 9 may be raised and lowered on the ways 7 by angularly disposed adjusting members 14 which are preferably in the form of screws rotatable in brackets 15 at the ends of the planer bed 6, said screws being in threaded engagement with the slides 8 of the planer table. It is obvious that the adjusting members 14 may be calibrated relative to the brackets 15 so that a uniform adjustment may be obtained for the part of the planer table.

The legs 2 of the end frames 1 are provided with stationary brackets 16 and adjustable brackets 17, the latter being arranged above the former and adjustably held relative to the legs 2 by clamping screws 18. The stationary brackets 15 afford nut portions 19 for raising and lowering screws 20 which are journaled in the adjustable brackets 17 and have the upper ends thereof provided with beveled gear wheels 21.

Journaled in the adjustable brackets 17 and connecting said brackets is a longitudinal shaft 22 provided with beveled gear wheels 23 and a hand wheel 24. The beveled gear wheels 23 mesh with the beveled gear wheels 21 and by rotating the hand wheel 24 the brackets 17 may be simultaneously raised and lowered relative to the legs 2. After the brackets have been adjusted the clamping screws 18 may be set to lock the brackets so that any vibrations of the machine will not loosen the brackets 17 nor cause the parts at the saw side of the machine to rattle.

At the outer ends of the adjustable brackets 17 are circular heads 25 and concentrically connected to said heads, as at 26, are the circular heads 27 of adjustable brackets 28 providing ways 29 for a saw table 30 which extends longitudinally of the machine. The bracket heads 27 are held in adjusted position relative to the heads 25 by clamping screws 31 extending through slots 32 in the heads 27 and it is through the medium of these adjustable heads that the saw table 30 may be swung at an angle relative to a horizontal plane and thus permit of material placed on the saw table 30 being mitered or beveled by a saw.

Figure 4:
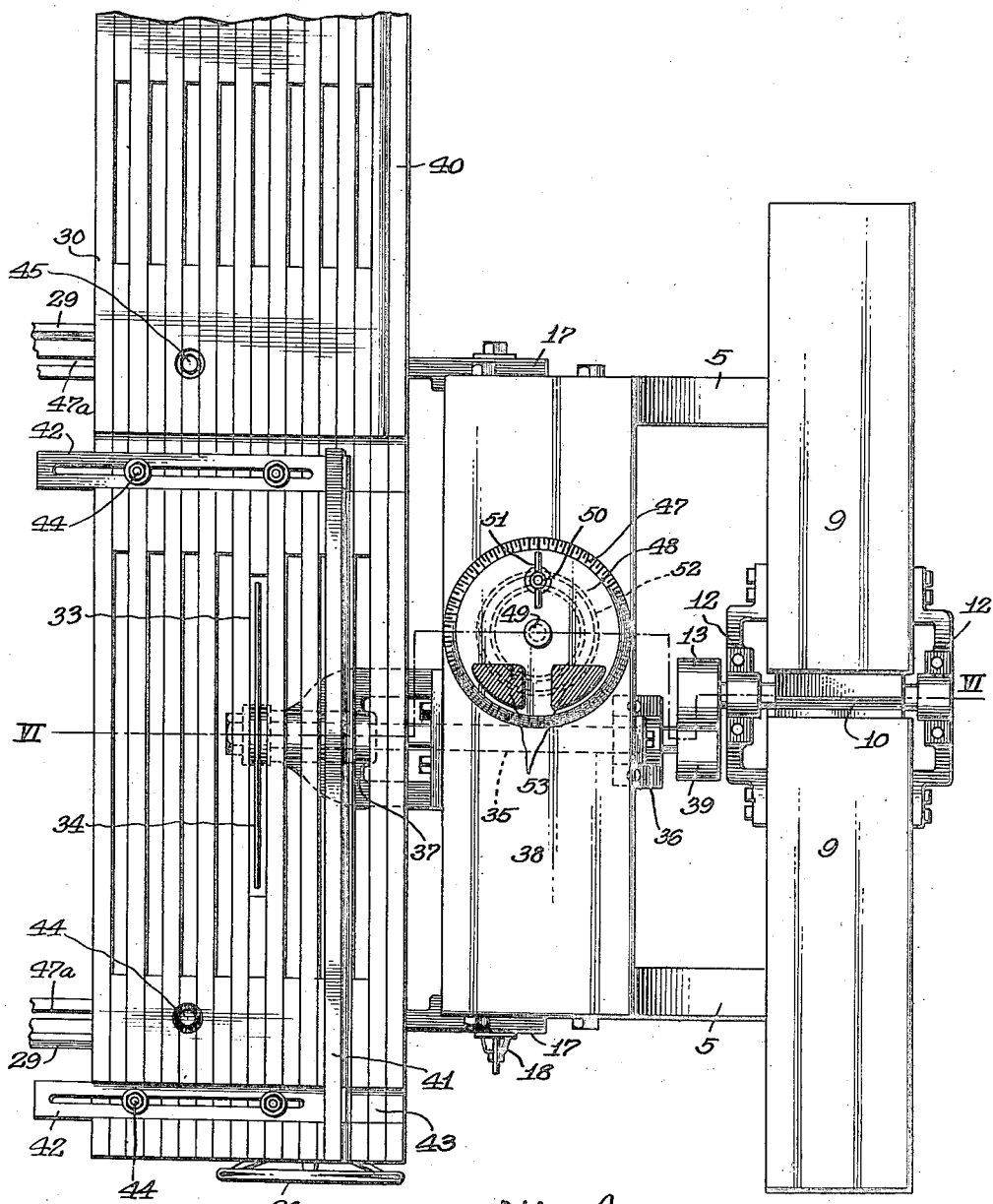
Fig. 4 is a horizontal sectional view of the machine as shown in Fig. 2.

The saw table 30, as best shown in Fig. 4, is composed of articulated slats providing a plurality of longitudinal slots 33 which not only permits of saw dust and residue matter passing through the saw table, but provides clearance for a circular saw 34 or other cutting tool detachably mounted on a shaft 35 journaled in bearings 36 and 37, the bearing 36 being supported from a bed plate 38 connecting the supports 4 of the end frames 1. The bearing 36 is located at the inner side of the bed plate 38, as best shown in Fig. 6 and the bearing 37 is supported from the outer side of said bed plate. On the inner end of the shaft 35 is a pulley 39 constantly in the same vertical plane as the pulley 13 of the planer.

On one end of the saw table 30 is a fixed longitudinal guide 40 located at the inner edge of said saw table and at the opposite end of the table is an adjustable longitudinal guide 41 carried by slotted arms 42 slidable in transverse grooves 43 provided therefor in the top of the saw table, and the slotted arms 42 may be fixed in adjusted positions by clamping bolts and nuts generally designated 44. The saw table 30 may be fixed in adjusted positions on the ways 29 by clamping bolts 45 held relative to the ways 29 by winged thumb nuts 46, and the ways 29 are slotted, as at 47ª, to provide clearance for the clamping bolts 45 so that the saw table 30 may be shifted on the ways 29 when the saw 34 is removed from the outer end of the saw shaft 35.

The circular saw 34 may be of the ripping or chisel tooth type and represents a conventional form of circular tool that may be mounted on the end of the shaft 35 to perform various kinds of work on material shifted into engagement with the tool when resting on the saw table 30. Since the saw table may be shifted in a horizontal plane and its adjustable guides 41 fixed it is obvious that a piece of work may be properly positioned and guided relative to the saw 34, and when the saw table is tilted at an angle relative to its normal horizontal plane, it is possible to miter, bevel, or otherwise provide a piece of work with an angular or inclined surface.

Suitably mounted on the bed plate 38 intermediate the ends thereof, is a circular graduated base 47 for a turn table 48 which is swiveled, as at 49, and adjustably held by a clamping bolt 50 and a winged thumb nut 51, said clamping bolt extending through the turn table 48 and having a head held in the dovetail annular groove in the base 47.

Figure 2:
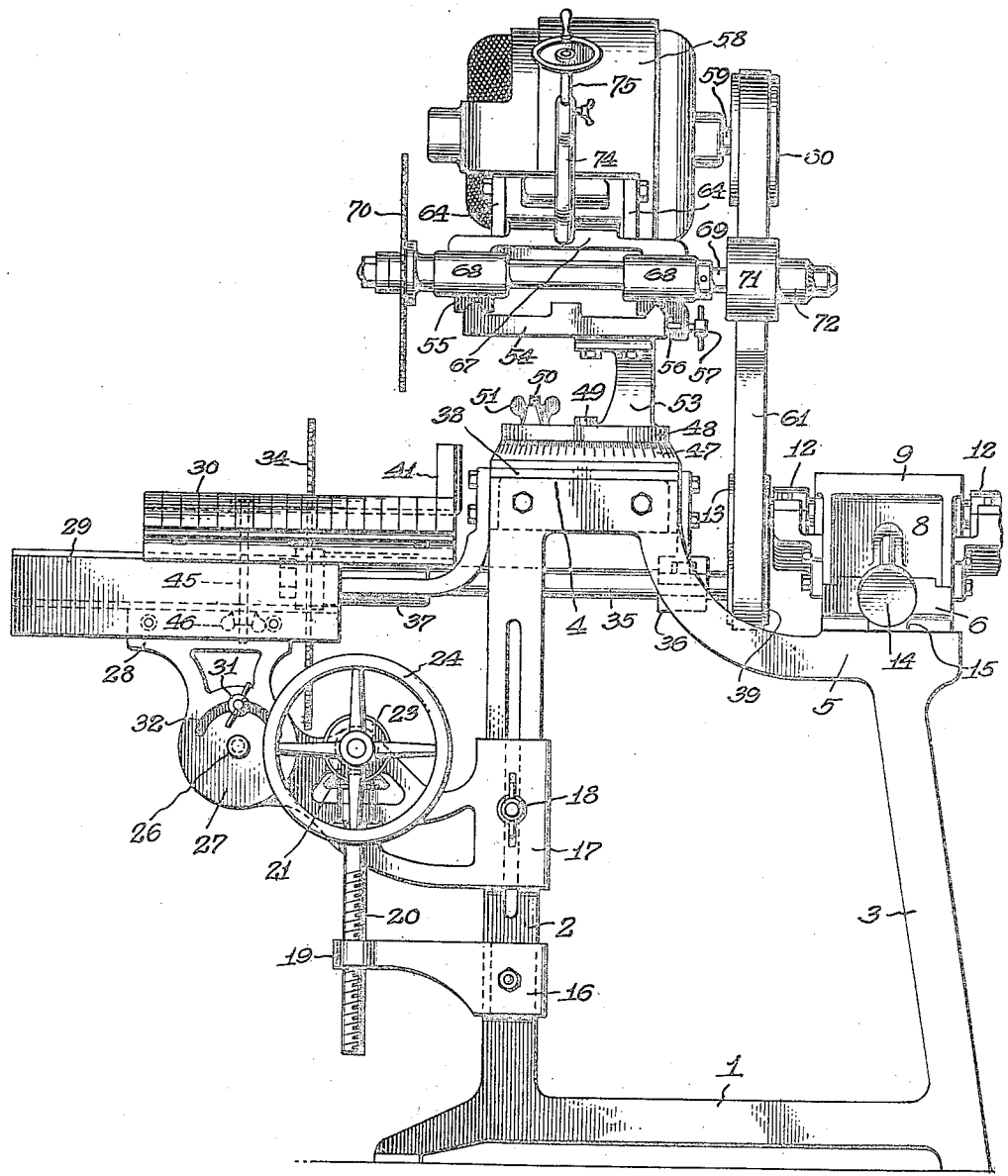
Fig. 2 is an end view of the machine.
Figure 3:
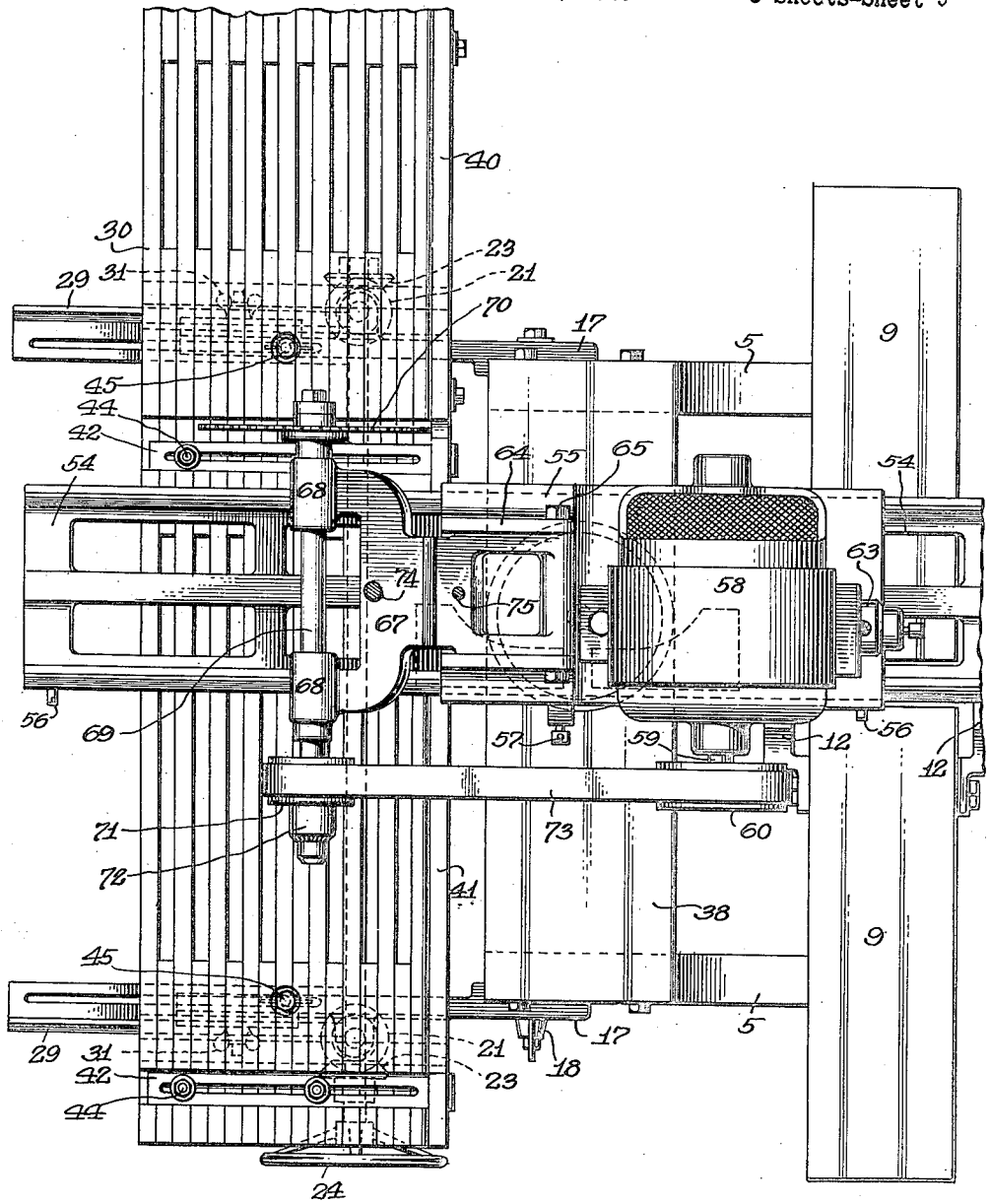
Fig. 3 is a plan view of the same showing the reciprocable saw adjusted for cross cut purposes.

The turn table 48 has side supports 53 for longitudinal ways 54 supporting a reciprocable carriage 55 and said carriage is limited in its longitudinal movement on the ways 54 by stop pins 56 carried by said ways as best shown in Figs. 1 to 3. The carriage 55 may be fixed relative to the ways 54 by a clamping screw 57 or similar device, and mounted on one end of said carriage is an electric motor 58 having its armature shaft 59 provided with a pulley 60, and in one position of the ways 54 the pulley 60 is in the same vertical plane as the pulleys 13 and 39 so that an endless belt 61 may be trained over the pulleys 60 and 39, and in some instances under the pulley 13, as brought out in full and dot and dash lines in Fig. 1 of the drawing. With the motor 58 adjusted to maintain the belt 61 taut on the pulleys 60 and 39 the saw shaft 35 may be driven, and with the motor 58 adjusted to permit of the belt 61 extending under the pulley 13, the planer shaft 11 may be operated in synchronism with the saw shaft 35. It is in this manner that the planer may be used by one artisan at the same time that another is using the saw 34.

The electric motor 58 has suitable lead in wires or conductors 62 and a switch 63 so that said motor may be operated and controlled from a suitable source of electrical energy (not shown).

The opposite end of the carriage has opposed side walls 64 and pivotally mounted between said side walls, as at 65, is the inner end of a yoke 67, which has its outer end provided with transversely alining bearings 68 for a combined saw and drill shaft 69. Detachably mounted on one end of the shaft 69 is a circular cross cut saw 70 or any suitable cutting tool and the opposite end of the shaft 69 is provided with a pulley 71 and a tool chuck 72, said tool chuck being designed to hold a drill or suitable boring tool. A belt 73 may be trained over the pulley 71 of the shaft 69 and the pulley 60 of the motor 58, so that said motor may be utilized for driving the shaft 69 and imparting movement to any tool attached to either end thereof.

The yoke 67 is provided with a hand piece 74 having a screw 75 adjustable in the yoke and bearing on the carriage 55, and it is through the medium of this screw that the yoke 67 may have its outer end raised and lowered relative to the carriage. The hand piece 74 permits of the carriage being reciprocated on the ways 54 and by adjusting the screw 75 the saw 70 may be raised or lowered relative to the saw table 30.

With the turn table 48 secured in the position shown in Fig. 2, and assuming that the shaft 69 is driven from the motor 58, it is possible to use the saw 70 somewhat as a swinging saw, that is, the saw 70 may be reciprocated to rip or operate upon any piece of material placed on the saw table 30 below the reciprocable saw. It is through the medium of the turn table 48 that the reciprocable saw may be swung in a lateral direction and positioned at any desired angle relative to the saw table 30, so that the saw 70 may be used for cross cut purposes, as shown in Fig. 3 or with a suitable tool on the end of the shaft 69 it is possible to gain or groove a piece of work. Furthermore, it is possible to provide the shaft 69 with two or more cutting tools, for instance a kerf cutting tool and a groove cutting tool whereby a piece of material may be simultaneously grooved and severed. A further instance of the use of the shaft 69 is that of anchoring the carriage 55 and then providing the chuck 72 with a suitable drilling or boring tool so that material supported on the end of the saw table 30 may be drilled and bored.

From the foregoing it will be observed that provision has been made for lateral, vertical and angular adjustment of work supports and tools so that various kinds of work may be performed by the machine, and while the drawings show a machine which has been used for some time, it is to be understood that the structural elements are susceptible to such variations and modifications as are permissible by the appended claims.

What I claim is:—

1. A wood-working machine comprising an adjustable saw table, an adjustable planer table, a saw for said saw table, a cutter for said planer table, shafts supporting said saw and cutter, pulleys on said shafts and in a common vertical plane, a third tool shaft mounted independently of said saw and cutter shafts and having a pulley thereon, a power transmission member adapted to be engaged around and to impart movement to either or both pulleys upon said saw and cutter shafts and also adapted to be interchangeably engaged around the pulley on said third tool shaft and means for maintaining the proper tension of said transmission member in any of the three arrangements.

2. A wood-working machine comprising a main frame, a turn-table pivotally mounted thereon, ways upon the turn-table, a motor mounted for reciprocation on said ways and having a pulley, a tool shaft upon the turn-table, a disk-like peripherally cutting tool such as a circular saw upon the shaft on the turn-table, a pulley on said shaft, a tool shaft upon the main frame, a disk-like peripherally cutting tool such as a circular saw upon the shaft on the main frame, a pulley on said shaft, a work table vertically adjustable whereby work placed upon the table may be brought within the range of action of either tool and independent of engagement with the other, and a belt adapted in one arrangement to be trained about the pulley on the motor and the pulley on the shaft on the main frame whereby movement of the motor on the ways will draw the belt taut, said belt being adapted in another arrangement to be trained about the pulley on the motor and the pulley on the turn-table.

3. A wood-working machine comprising a main frame, a turn-table pivotally mounted thereon, ways upon the turn-table, a motor mounted for reciprocation upon said ways, a tool shaft upon the turn-table, two tool shafts mounted in the main frame, each of the three tool shafts having a pulley, and a power transmission member adapted when in one position to connect the pulley on the turn-table with the motor and adapted when in another position to enter into driving engagement with the pulleys upon both tool shafts upon the main frame.

4. A wood-working machine comprising a main frame, a tool shaft upon the frame, and having a disk-like peripherally cutting tool such as a circular saw, a work-table mounted upon said frame, and having a work carriage slidably mounted thereon, and a second tool-shaft mounted above the first-mentioned shaft and having a tool operated thereby, said work table being vertically adjustable from a position within the range of action of the lower tool to a higher position wherein the work-carriage may slide to present work to the upper tool.

5. A wood-working machine comprising a main frame, a tool shaft mounted in the frame, a pulley on said shaft and a tool driven thereby, a turn-table on said frame, a motor on said turn table, the motor having a pulley, a tool shaft carried by the turn-table, a pulley on said shaft, a tool driven thereby and a belt adapted for interchangeable driving connection between the pulley on the motor and the pulley on either tool shaft and a work carriage vertically adjustable on the main frame with a range of movement such that in one position of adjustment work on the table will be within the range of action of one tool and in another position of adjustment the work will be within the range of action of the other tool.

6. A wood-working machine comprising a vertically adjustable work-table, a tool shaft beneath said table, a circular saw mounted on said shaft, with its periphery extending to a point above the top of the table at its lower position of adjustment, a reciprocating carriage mounted on ways angularly adjustable in a horizontal plane, a disk-like peripherally cutting tool mounted on said carriage and movable transversely of the work-table at its upper position of adjustment.

7. A wood-working machine comprising a main frame, a tool shaft mounted in the frame, a pulley on said shaft and a tool driven thereby, a turn-table on said frame, a motor on said turn-table, the motor having a pulley, a tool shaft carried by the turn-table, a pulley on said shaft, a tool driven thereby, a belt adapted for interchangeable driving connection between the pulley on the motor and the pulley on either tool shaft, a work carriage vertically adjustable on the main frame and having a sliding carriage thereon, the extent of vertical movement of the work carriage being such that the sliding carriage and work thereon may be lifted out of the range of action of the lower tool whereby the sliding carriage may be moved toward and from the tool upon the turn-table.

In testimony whereof I affix my signature in the presence of two witnesses.

LOUIS de LINIERES.

Witnesses:
KARL H. BUTLER,
ANNA M. DORR.